United States Patent
Zhang et al.

(10) Patent No.: US 8,050,459 B2
(45) Date of Patent: Nov. 1, 2011

(54) SYSTEM AND METHOD FOR DETECTING PEDESTRIANS

(75) Inventors: Wende Zhang, Shelby Township, MI (US); Mark J. Wolski, Warren, MI (US)

(73) Assignee: GM Global Technology Operations LLC, Detriot, MI (US)

( * ) Notice: Subject to any disclaimer, the term of this patent is extended or adjusted under 35 U.S.C. 154(b) by 767 days.

(21) Appl. No.: 12/179,645

(22) Filed: Jul. 25, 2008

(65) Prior Publication Data

US 2010/0021010 A1    Jan. 28, 2010

(51) Int. Cl.
  *G06K 9/00* (2006.01)
(52) U.S. Cl. ...................................... 382/104
(58) Field of Classification Search .......... 382/100–107; 340/907–912, 933–940; 348/113–120
  See application file for complete search history.

(56) References Cited

U.S. PATENT DOCUMENTS

| | | | | |
|---|---|---|---|---|
| 7,822,231 | B2* | 10/2010 | Coimbra et al. | 382/107 |
| 2007/0274566 | A1* | 11/2007 | Fujimoto | 382/103 |
| 2010/0002908 | A1* | 1/2010 | Miyamoto et al. | 382/103 |

* cited by examiner

*Primary Examiner* — Samir Ahmed
*Assistant Examiner* — Atiba Fitzpatrick (57) ABSTRACT

A method is provided for detecting a pedestrian exterior to a vehicle by use of a vehicle-mounted image-based monitoring system. An edge-based pedestrian detection analysis is applied to the input image data to determine an edge-based confidence value of a candidate image area being a pedestrian. A motion-based pedestrian detection analysis is applied to the input image data to determine a motion-based confidence value of a candidate image area being a pedestrian. A final confidence value is obtained by combining the edge-based confidence value and motion-based confidence value using weighting factors that are functions of vehicle speed. The final confidence value is compared to a threshold value for determining whether to generate a warning that a pedestrian may be present in the input image data.

16 Claims, 6 Drawing Sheets

INPUT IMAGE DATA

FIG. 5

VERTICAL EDGE MAP DATA

CANDIDATE OBJECT REGIONS

FIG. 9

PROCESSED PROJECTIONS

MOTION MAP

FIG. 13

VERTICAL OBJECT PROJECTION PLOT

FIG. 14

CANDIDATE OBJECT REGIONS

SYSTEM AND METHOD FOR DETECTING PEDESTRIANS

BACKGROUND OF INVENTION

The present invention relates generally to pedestrian detection for an image-based monitoring system.

Pedestrian monitoring systems are used to alert a vehicle driver of the presence of a pedestrian in the vehicle's driving path. The vehicles driving path may include a forward-driven direction or a rearward-driven direction. A vision-based pedestrian monitoring system relies on pattern matching and target searching techniques to identify pedestrians in a captured image. Such systems can have high detection accuracy if their matching templates cover all the variations of pedestrians and environments. Given the number of template variations required, it would be difficult to develop an all-encompassing set of templates for the variations of pedestrians and environments. Moreover, the search techniques for searching the various templates would be computationally complex resulting slow processing times.

SUMMARY OF INVENTION

An advantage of the invention provides reduced computation routines and fast processing speeds for detecting a pedestrian in the captured image data. The system utilizes a first detection method that is reliable at detecting pedestrians at static or low speeds and a second detection method that is reliable at detecting pedestrians at faster speeds. The two methods are complimentarily merged for cooperatively determining the presence of a pedestrian.

An embodiment contemplates a method for detecting a pedestrian exterior of a vehicle in an image-based monitoring system. The vehicle includes an image capture device for capturing images exterior of the vehicle. The image-based monitoring system includes a processor for processing image data received from the image capture device for detecting a pedestrian exterior of the vehicle. Input image data is received from the image capture device. A pedestrian edge-based detection analysis is applied to the input image data for detecting a pedestrian candidate in the input image data. The edge-based detection analysis determines an edge-based confidence value for indicating a confidence level of the pedestrian candidate being a pedestrian. A pedestrian motion-based detection analysis is applied to the input image data for detecting a pedestrian candidate in the input image data. The motion-based detection analysis determines a motion-based confidence value for indicating a confidence level of the pedestrian candidate being a pedestrian. A speed of the vehicle is determined. A first weighting factor is applied as a function of the vehicle speed to the edge-based confidence value and a second weighting factor is applied as a function of the vehicle speed to the motion-based confidence value for determining a final confidence value. The final confidence value is compared to a threshold value for determining whether to generate a warning that a pedestrian may be present in the input image data.

An embodiment contemplates a pedestrian detection system for detecting a pedestrian exterior of a vehicle in an image-based monitoring system. The system includes an image capture device for capturing images exterior of the vehicle. A processor processes input image data received from the image capture device. The processor applies an edge-based detection analysis for determining an edge-based confidence value for indicating a confidence level of the pedestrian candidate being a pedestrian. The processor further applies a motion-based detection analysis to the input image data for determining a motion-based confidence value for indicating a confidence level of the pedestrian candidate being a pedestrian. The processor applies a first weighting factor as a function of a vehicle speed to the edge-based confidence value and applies a second weighting factor as a function of the vehicle speed to the motion-based confidence value for determining a final confidence value. The processor compares the final confidence value to a threshold value for determining whether to generate a warning that a pedestrian may be present in the input image data. An image display displays input image data and for identifies a location of the pedestrian on the image display.

DETAILED DESCRIPTION

Figure 1:
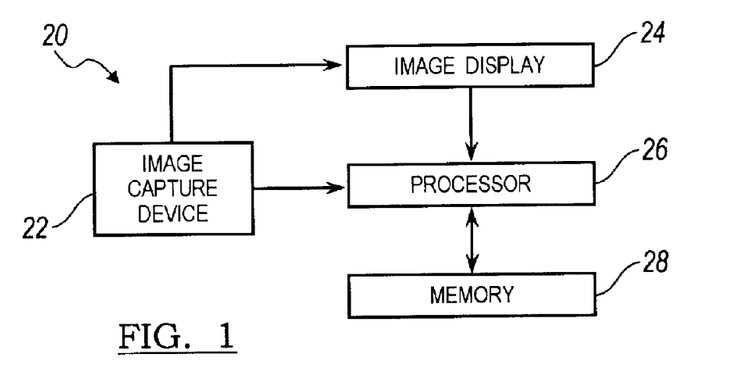
FIG. 1 is an embodiment of an image-based monitoring system.

There is shown in FIG. 1 an image-based monitoring system, shown generally at 20, for detecting a pedestrian exterior of the vehicle. The image-based monitoring system 20 may be used to detect pedestrians in a forward driven direction or a rearward driven direction when the vehicle is operating. The image-based monitoring system 20 may be used during daytime or nighttime driving for detecting a presence of the pedestrian.

The image-based monitoring system 20 includes an image capturing device 22 including, but not limited to, a camera or other vision-based devices for capturing images exterior of the vehicle. An image display device 24 is provided for displaying the image captured by the image capturing device 22 to the driver of the vehicle. Examples of the image display device 24 include, include but are not limited to, monitor-type displays, a projection-type imaging, holograph-type imaging, or similar imaging displays.

The image-based monitoring system 20 further includes a processor 26 for receiving and processing the images captured by the image capturing device 22. A memory storage device 28 may also be provided for storing and retrieving image data.

The processor 26 executes a program that uses two detection analysis methods for which the results of each method are weighted as a function of the vehicle speed for determining the presence of the pedestrian in the image data. The objects determined as pedestrians in the image data are highlighted in the image display device 24. The term highlighting refers to identifying the location of the pedestrian in the image data and may be performed by any comparable method for showing the location of the pedestrian in the image data.

Figure 2:
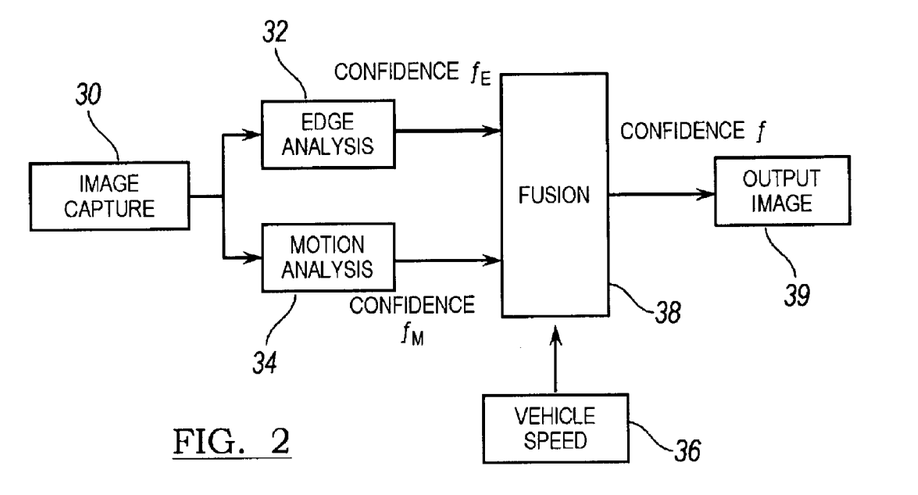
FIG. 2 is a block diagram of a method for detecting pedestrians form the image data captured from an image-based capturing device.

FIG. 2 illustrates a block diagram of a method for detecting pedestrians from the captured image data. The pedestrian detection method is based on a fusion technique that combines two detection methods for detecting a pedestrian within the captured image data. In block 30, image data is retrieved from the image capturing device. The image capturing device may include a vision based imaging device or any other similar device that captures the images of the environment exterior of the vehicle.

In block 32, an edge-based detection analysis, which will be discussed in detail later, is executed for generating an edge-based confidence value $f_E$ which provides a respective confidence value of whether a respective object in the captured image is a pedestrian candidate. The edge-based detection analysis receives the image data and then utilizes edges of the respective objects in the image to determine whether an object is a potential candidate for a respective pedestrian in the image.

In block 34, a motion-based detection analysis, which will be discussed in detail later, is executed for generating a motion-based confidence value $f_M$ which provides a respective confidence value of whether a respective object in the image is a pedestrian candidate. Block 32 and block 34 may be performed concurrently with one another.

In block 36, a vehicle speed is determined. The vehicle speed may be detected from wheel speed sensors, a body or engine control module, or other similar device that may accurately determine the speed of the vehicle.

Figure 3:
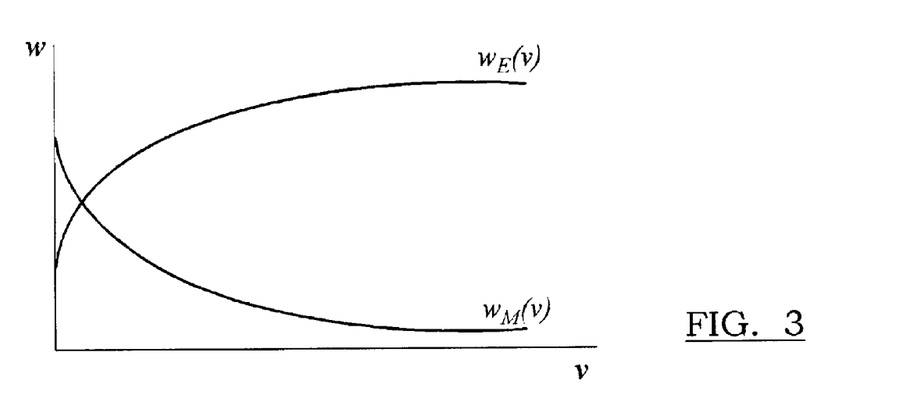
FIG. 3 is a graph of weighting curves based on a function of vehicle speed.

In block 38, a fusion technique is applied for determining a final confidence value for the pedestrian candidate being a pedestrian. The final confidence value is determined by applying respective weighting values to the edge-based confidence value $f_E$ and the motion-based confidence value $f_M$. The respective weighting values are determined as a function of the speed of the vehicle. FIG. 3 illustrates a graph for selecting a respective weighting value for both the edge-based confidence value $f_E$ and the motion-based confidence value $f_M$. That is, a predetermined weighting curve is provided for both the edge-based confidence value $f_E$ and the motion-based confidence value $f_M$. Based on the speed that the vehicle is traveling, a respective weighting factor is derived from each respective curve and applied to the respective confidence values for determining a final confidence value. The formula for determining the final confidence value f is represented by the following formula:

$$f = w_E(v) * f_E + w_M(v) f_M$$

where $f_E$ is an edge-based confidence value, $w_E(v)$ is a weighting factor based on vehicle speed for the edge-based confidence value, $f_M$ is a motion-based confidence value, $w_M(v)$ is a weighting factor based on vehicle speed for the motion-based confidence value.

The final confidence value f is compared to a predetermined threshold value for determining whether to warn the driver that a pedestrian may be present. In block 38, if the final confidence value is greater than the threshold value, then the pedestrian candidate is determined to be a pedestrian and the pedestrian is highlighted in the output image displayed on the imaging device in block 39. The pedestrian may be identified in the image display by a box outlining the pedestrian, a shading, a flagging, a highlight, or any other identifier which provides notification to a driver of a pedestrian in the viewing area of the image display device.

Figure 4:
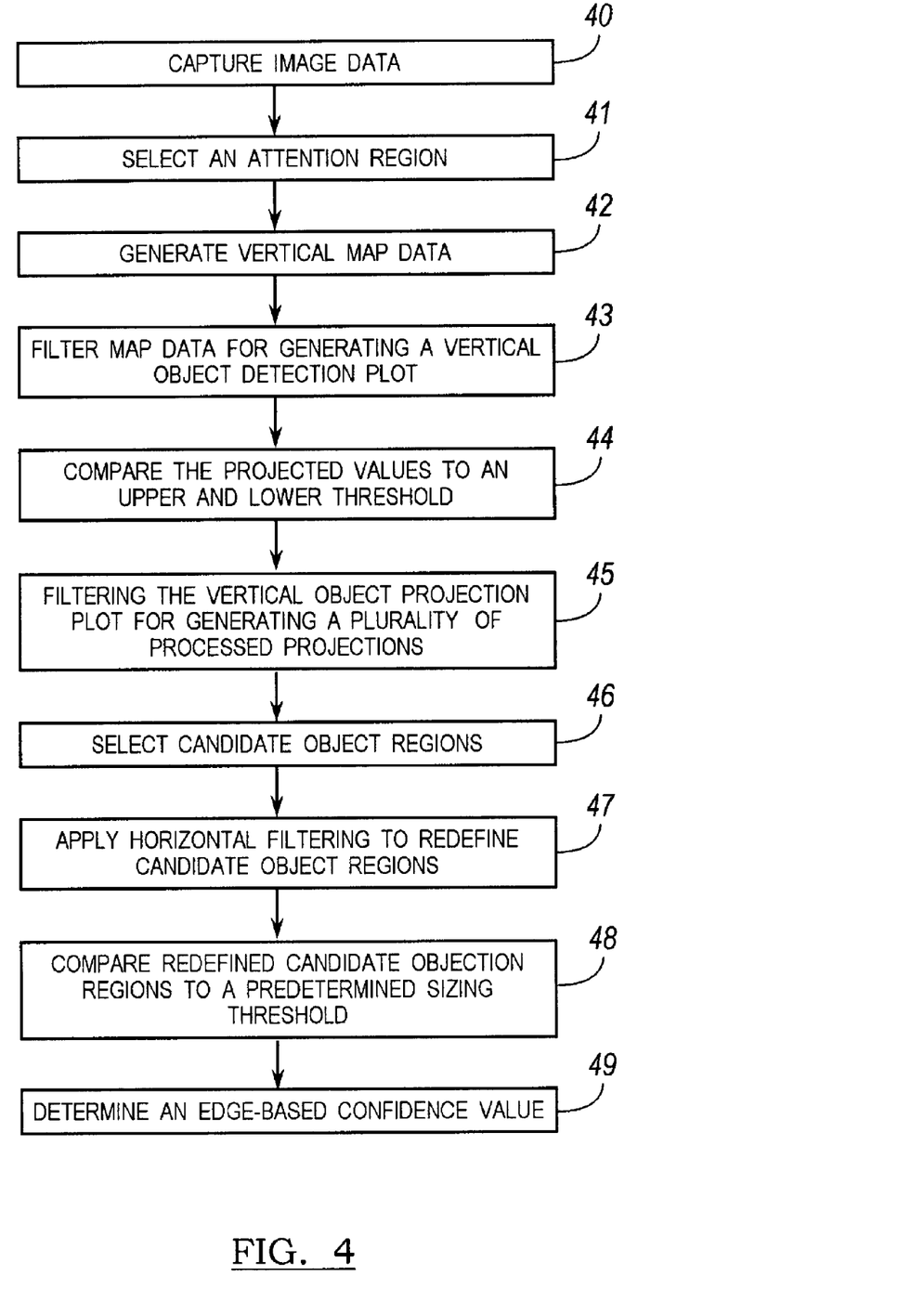
FIG. 4 is a flowchart of an edge-based detection method.

FIG. 4 illustrates a flowchart of the edge-based detection method. In step 40, input image data is received in the processor from the image capture device. An illustration of the input image is shown in FIG. 5.

Figure 5:
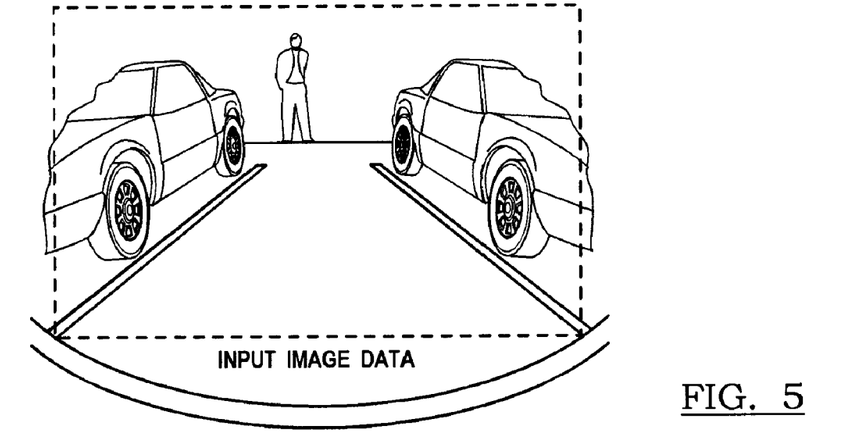
FIG. 5 illustrates a captured image from an image-based capturing device.

In step 41, an attention region is selected which is also shown in FIG. 5. The attention region applies to an area where a respective pedestrian would likely be present (i.e., the attention region excludes those areas of the vehicle that are captured by the image capture device such as the hood, trunk, or other areas not part of the trajectory driving path).

Figure 6:
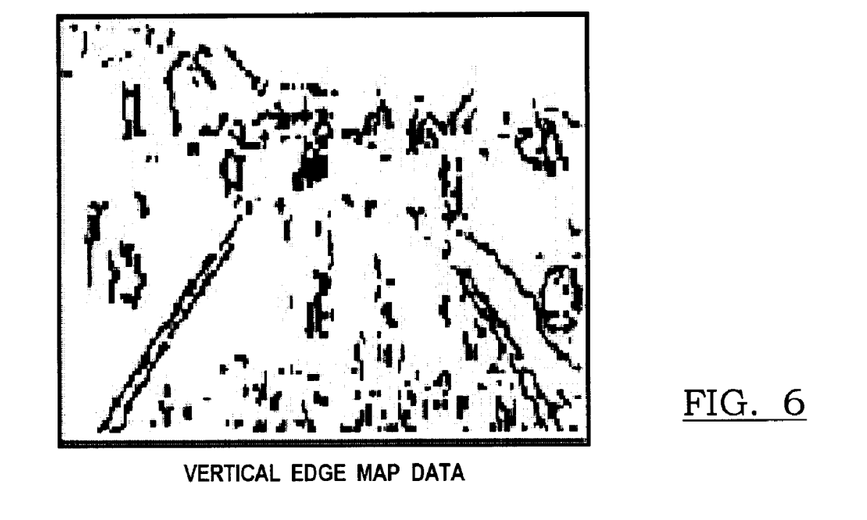
FIG. 6 is a graph of a vertical edge map data.

In step 42, vertical edge map data is generated by detecting vertical edges of the input map data. That is, only vertical edges of the objects in the input map data are used in generating the vertical edge map data. An illustration of the vertical edge map data is shown in FIG. 6. In order to detect vertical edges, the input image is viewed as a matrix of pixels. A correlation filter is applied to the input image. Any of several filters which magnify changes in the horizontal direction and attenuate changes in the vertical direction may be used. One such common filter that may be used, but is not limited to, is a 3×3 Sobel mask:

$$\text{Vertical Edge Sobel filter mask} = \begin{bmatrix} -1 & 0 & 1 \\ -2 & 0 & 2 \\ -1 & 0 & 1 \end{bmatrix}$$

For a pixel in question, the correlation process takes a 3×3 region surrounding the respective pixel and multiplies the value of each pixel in the respective region by its corresponding sobel mask value. Each of the resulting product values are then added to obtain the "edge pixel value" for the center pixel. A pixel is a vertical edge point, if the absolute of "edge pixel value" is greater than a threshold. For a respective image, the operation is performed at each pixel location over the entire image.

Figure 7:
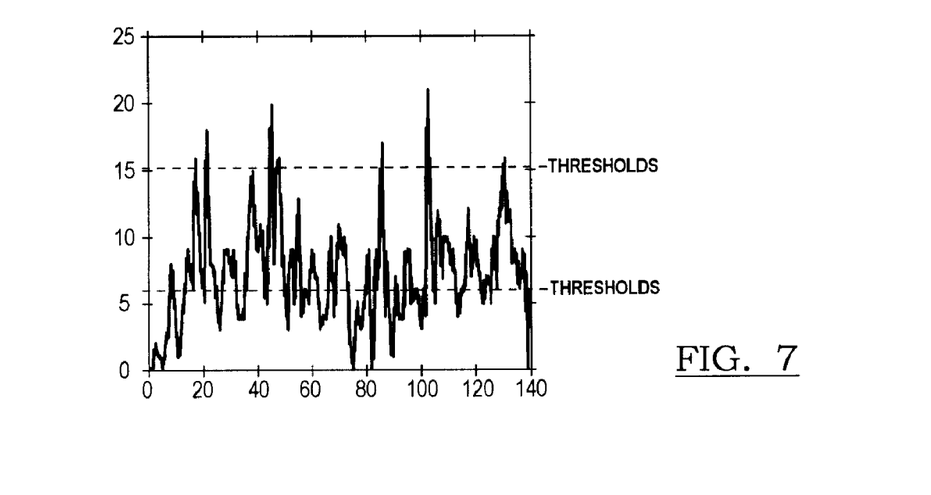
FIG. 7 is a graph of a vertical object projection plot.

In step 43, the vertical edge map data is filtered for generating a vertical object projection plot. This is performed by counting the vertical edges within a column and projecting the number of edges onto a plot. As described earlier, the vertical edge map data is represented in the attention region as a matrix of pixels uniformly aligned in rows and columns. For a respective vertical column of pixels within the matrix, a number of pixels occupying the respective vertical column are counted for producing a projection value. The projection value for the respective column is then plotted in the vertical object projection plot. This procedure is repeated for each column of the vertical edge map data until a respective projected value for each column has been plotted onto the vertical object projection plot. An example of the vertical object projection plot is illustrated in FIG. 7.

In step 44, each of the projection values (i.e., the plotted value of each column of the vertical object projection plot) is compared to an upper and lower threshold for smoothing the vertical object projection plot. For those respective projection values that exceed the upper threshold, the respective projection values are saturated. For those respective projection values that are less than the lower threshold, then the respective projection values are set to zero.

Figure 8:
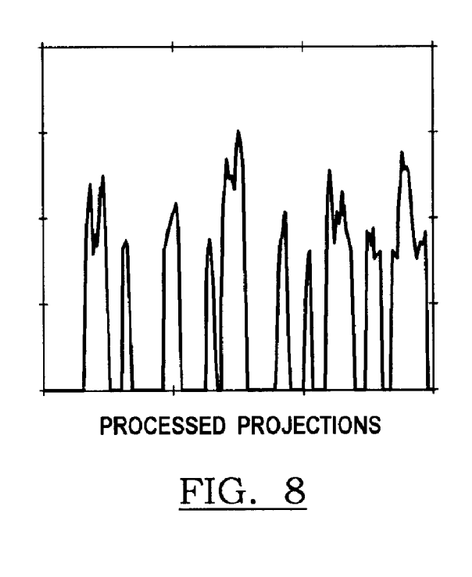
FIG. 8 is a graph of a plurality of process projections.

In step 45, filtering is applied to the vertical object projection plot by applying a smoothing technique for generating a plurality of processed projections. The smoothing technique removes incremental changes in the respective vertical edge projection plot for smoothing the transition between each of the respective projection values. An example of the plurality of process projections is illustrated in FIG. 8.

Additional smoothing may be applied to the processed projections by determining the horizontal spacing between each respective processed projection. If an adjacent set of processed projections are less than a predetermined spacing, the respective set of processed projections are merged into a single respective processed projection.

Figure 9:
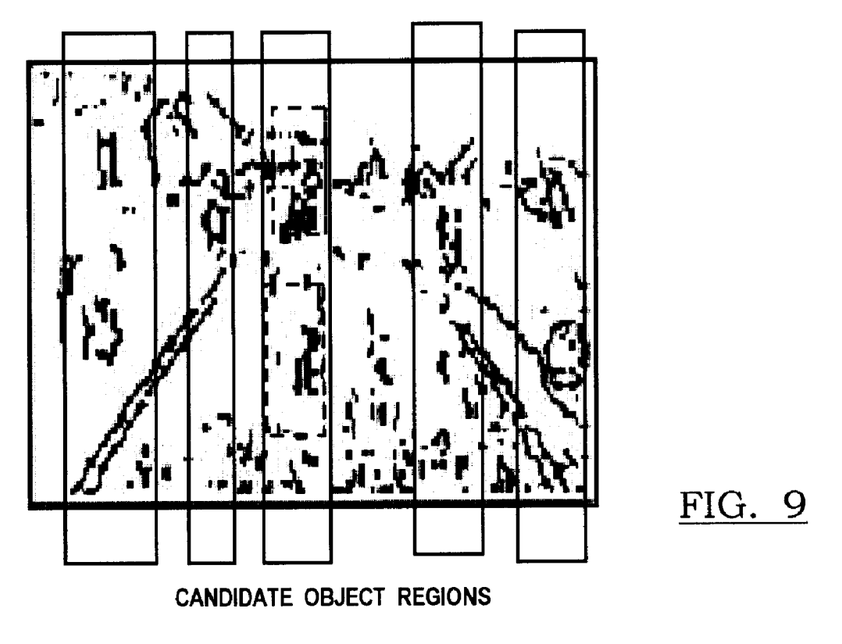
FIG. 9 illustrates candidate object regions in image data.

In step 46, the candidate object regions are selected from the process projections. The candidate object regions are overlaid onto the vertical edge map data for identifying candidate object regions. The candidate object regions are illustrated by the elongated rectangular boxes extending through the image data as illustrated in FIG. 9.

Figure 10:
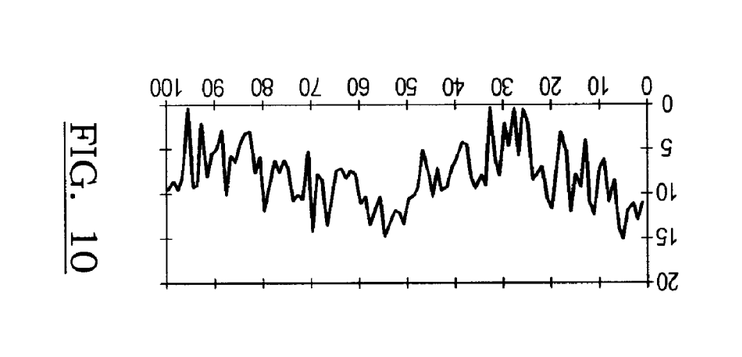
FIG. 10 illustrates a horizontal filtering plot of a candidate object region.

In step 47, horizontal filtering is applied to the objects in each of the candidate object regions for redefining the candidate object regions. An example of a horizontal filtering plot for a respective candidate region (i.e., a respective rectangular box shown in FIG. 9) is shown in FIG. 10. The vertical images within each candidate object region is filtered horizontally for further redefining the candidate object regions. The redefined candidate object regions are illustrated by the narrowed rectangular boxes within the respective candidate object regions as illustrated in FIG. 9.

In step 48, the redefined candidate object regions are compared to a predetermined sizing threshold. The predetermined sizing threshold includes sizing constraints that are based on a pedestrian's size and/or positioning. For example, a sizing constraint may include a pedestrian height, a pedestrian's head and foot locations, and a pedestrian's height to width ratio. The sizing constraints may be used individually for comparison or in combination when comparing to the redefined object region.

In step 49, an edge-based confidence value is determined in response to comparing the respective redefined candidate object regions and the predetermined sizing thresholds for each potential pedestrian candidate.

Figure 11:
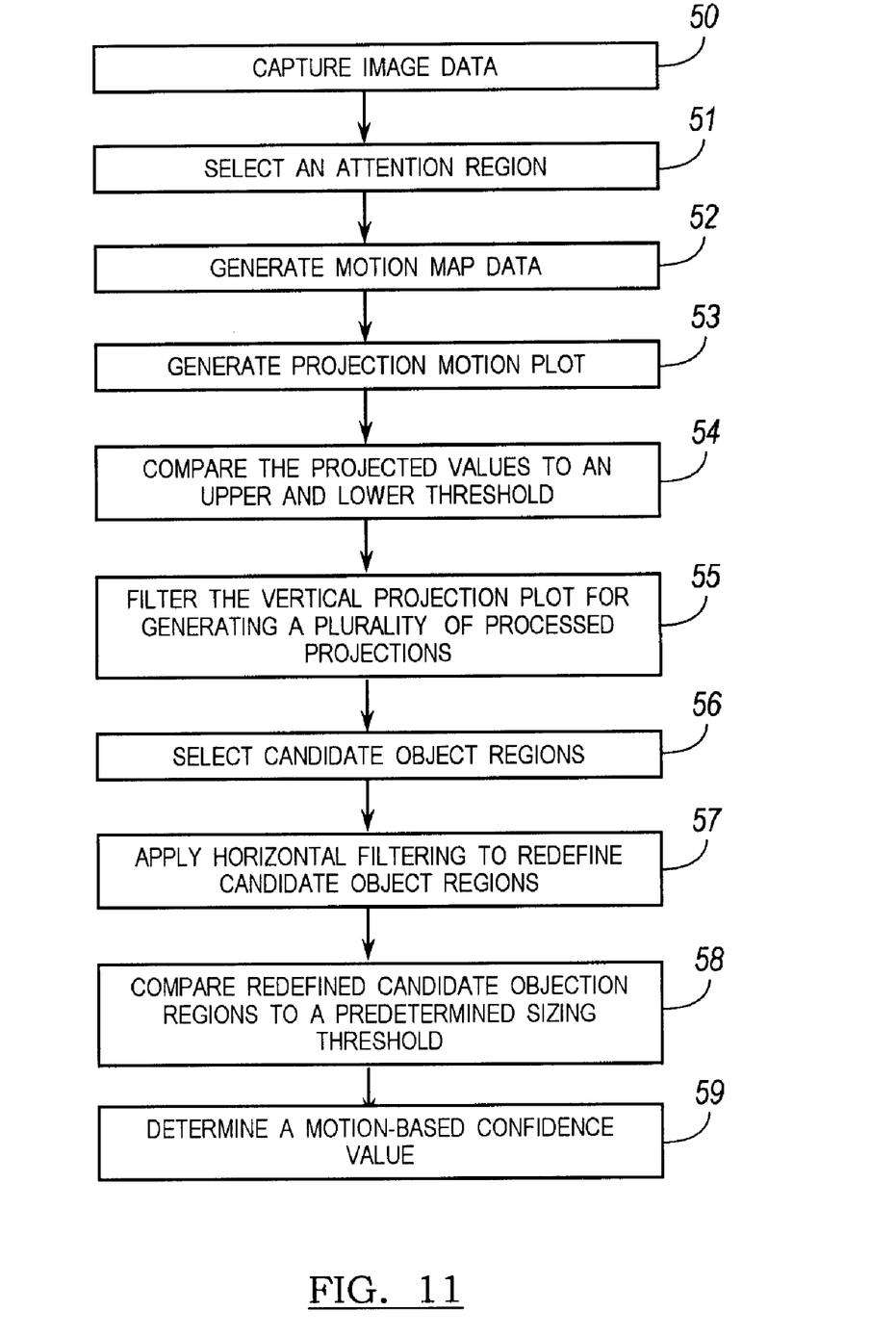
FIG. 11 illustrates a flowchart of a motion-based detection method.

FIG. 11 illustrates a flowchart of the motion-based detection method. In step 50, an input image data is received from the image capture device. In step 51, the attention region is selected.

In step 52, a motion map is generated from the input image data captured by the image capture device. Gaussian filtering may be applied to the image map data. The motion of an object is detected by image differencing. Image differencing includes capturing an image at a first instance of time (e.g., a first image frame) and comparing it with an image captured at a second instance of time (e.g., a next image frame) for detecting motion between the two images. Typically, the motion-based detection method is ideal when the vehicle is at static or low speed. A difference in the displacement of the image greater than a predetermined threshold between the first instance of time and the second instance of time indicates a potential pedestrian candidate.

Figure 12:
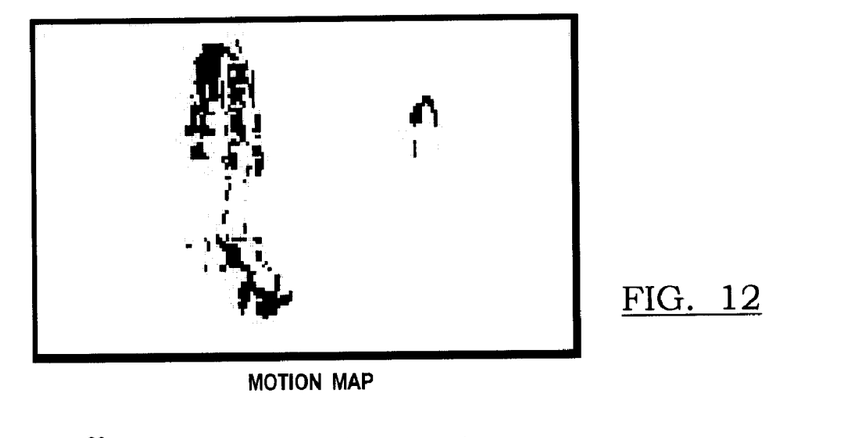
FIG. 12 is a graph of a motion map of the captured image.

The motion map displays those potential candidates where motion is detected. However, in generating the motion map, deficiencies may occur since portions of a pedestrian's body between a first frame and a second frame may not be detected as motion due to inefficient differentiation with a background of the image. The system detects motion by detecting changes in the image with respect to the image background. Therefore, motion may not be detected in a body of the object where different portions of the object constantly occupy a same location over the course of both frames. That is, for detecting motion based on a vision system, there has to be some differentiation between the object in motion and the background of the image over the first and second frame. For a given location of the image, if a portion of the pedestrian's body is detected at the given location in the first frame and the background is detected at the given location at the second frame, or vice versa, then it is determined that motion is present. Motion of pedestrian's body is more easily detected at the arms or extremities than at the center of the pedestrian's body. For example, the torso may occupy the same location over the first frame and the second frame, and therefore, the background is not detected at that given location. As a result, it is conceivable that the system may determine that no motion has taken place at this respective location because there has been no transition between the body and the background at the respective location. Therefore, without some correction feature, this center region would be perceived as having no movement and would not be illustrated as motion in the motion map data. The motion map data would resemble more of a shell than a solid mass.

To compensate for the perceived lack of motion, a fraction of the projected motion of a detected pedestrian in the first frame is added to the projected motion of the second frame when the motion map is generated. This fills the centering portion of the pedestrian to eliminate a void that would otherwise be represented as a no motion at this location. As a result, the motion is represented for these respective portions of the object. An example of a motion map is illustrated in FIG. 12.

Figure 13:
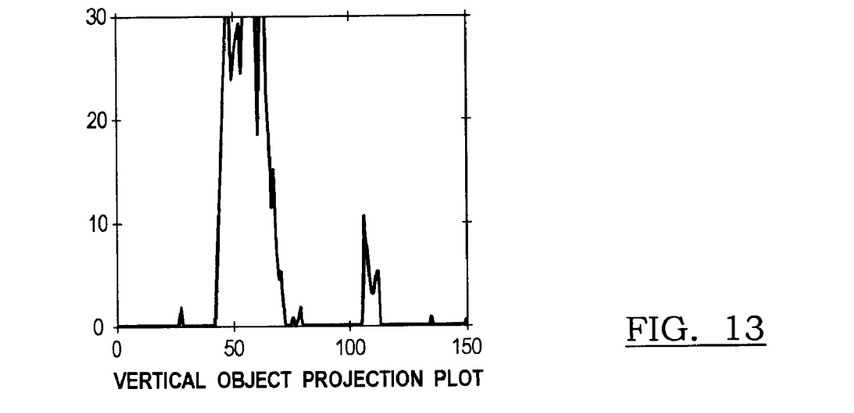
FIG. 13 is a graph of a vertical object projection plot.

In step 53, the motion map is projected vertically (e.g., vertical edge map data) to generate a projection of motion plot. Similar to the edge detection method, the motion map is represented as a matrix of pixels uniformly aligned in rows and columns. For a respective vertical column, the number of pixels occupying the respective column is counted and then plotted on to a vertical object projection plot as a projection value. This step is repeated for each column of the motion map until all of the projection values for each column have been plotted onto the vertical object projection plot. An example of the vertical object projection plot is illustrated in FIG. 13.

Figure 14:
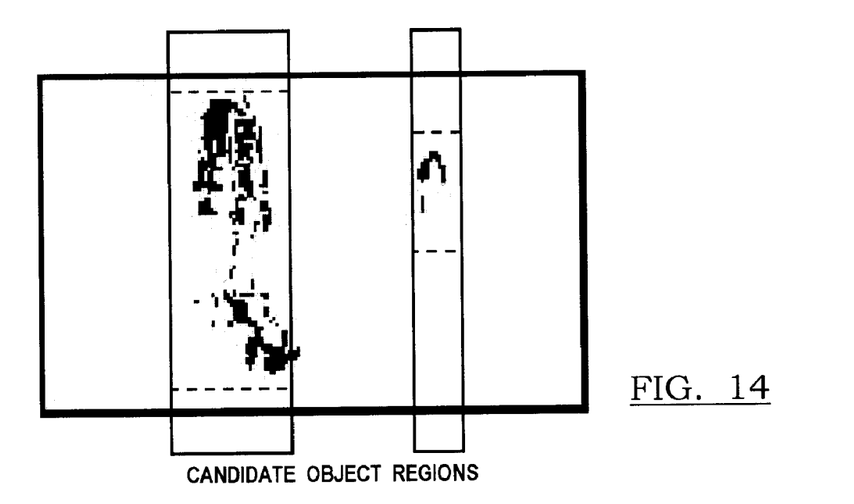
FIG. 14 is a graph illustrating redefined candidate object regions.

Steps 54-58 are identical to steps 44-48 and for redundancy purposes, these steps will not be discussed for this embodiment. An example of the redefined candidate object regions generated by steps 54-58 is illustrated in FIG. 14.

In step 59, a motion-based confidence value is determined in response to comparing the respective redefined candidate object regions and the predetermined sizing thresholds for each potential pedestrian candidate.

While certain embodiments of the present invention have been described in detail, those familiar with the art to which this invention relates will recognize various alternative designs and embodiments for practicing the invention as defined by the following claims.

What is claimed is:

1. A method for detecting a pedestrian exterior of a vehicle in an image-based monitoring system, the vehicle having an image capture device for capturing images exterior of the vehicle, the image-based monitoring system including a processor for processing image data received from the image capture device for detecting the pedestrian exterior of the vehicle, the method comprising the steps of:

receiving input image data from the image capture device;

applying a pedestrian edge-based detection analysis to the input image data for detecting a pedestrian candidate in the input image data, the edge-based detection analysis determining an edge-based confidence value for indicating a confidence level of the pedestrian candidate being a pedestrian;

applying a pedestrian motion-based detection analysis to the input image data for detecting a pedestrian candidate in the input image data, the motion-based detection analysis determining a motion-based confidence value for indicating a confidence level of the pedestrian candidate being a pedestrian;

determining a speed of the vehicle;

applying a first weighting factor as a function of the vehicle speed to the edge-based confidence value and applying a second weighting factor as a function of the vehicle speed to the motion-based confidence value for determining a final confidence value; and comparing the final confidence value to a threshold value for determining whether to generate a warning that a pedestrian may be present in the input image data.

2. The method of claim 1 further comprising the step of outputting the image to an image display device for identifying a location of the pedestrian in the captured image.

3. The method of claim 1 wherein applying the edge-based detection analysis for determining the edge-based confidence value comprises the steps of:

generating vertical edge map data from the input map data;

filtering the vertical edge map data for generating a vertical object projection plot;

selecting candidate object regions in response to the vertical object projection plot;

applying horizontal filtering to the candidate object regions for redefining the candidate object regions;

comparing the respective redefined candidate object regions to a predetermined sizing threshold; and determining the edge-based confidence value in response to comparing the respective redefined candidate object regions and the predetermined sizing threshold.

4. The method of claim 3 wherein the step of filtering the vertical edge map data for generating a vertical object projection plot further comprises the steps of:

comparing projection values of the vertical object projection plot to an upper projection threshold and a lower projection threshold;

saturating respective projection values that exceed the upper projection threshold; and setting respective projection values that are less than the lower projection threshold to a zero value.

5. The method of claim 4 wherein the step of filtering the vertical edge map data for generating a vertical object projection plot further comprises the step of:

applying a smoothing technique to the vertical object projection plot for generating a plurality of processed projections.

6. The method of claim 5 further comprising the steps of:

determining a horizontal spacing between each respective processed projection; and merging an adjacent set of processed projections if the horizontal spacing is less than a predetermined spacing.

7. The method of claim 6 wherein the predetermined sizing threshold is based on predetermined pedestrian height characteristics.

8. The method of claim 7 wherein the predetermined sizing threshold is further based on predetermined pedestrian height to width ratio.

9. The method of claim 6 wherein the predetermined sizing threshold is based on predetermined pedestrian head and foot locations.

10. The method of claim 1 wherein applying the motion-based detection analysis for determining the motion-based confidence value comprises the steps of:

generating a motion map from the input image data by determining a displacement of an object between a first instance of time and at a second instance of time;

generating vertical edge map data from the motion map by determining vertical edges of objects in the motion map;

filtering the vertical edge map data for generating a vertical object projection plot;

selecting candidate object regions in response to the vertical object projection plot;

applying horizontal filtering to the candidate object regions for redefining the candidate object regions;

comparing the respective redefined candidate object regions to a predetermined sizing threshold; and determining the motion-based confidence value in response to comparing the respective redefined candidate object regions and the predetermined sizing threshold.

11. The method of claim 10 wherein the step of generating a motion map from the input image data is performed after Gaussian filtering.

12. The method of claim 10 wherein filtering the vertical edge map data for generating a vertical object projection plot further comprises:

comparing projection values of the vertical object projection plot to a an upper projection threshold and a lower projection threshold;

saturating respective projection values that exceed the upper projection threshold; and setting respective projection values that are less than the lower projection threshold to a zero value.

13. The method of claim 12 wherein the step of filtering the vertical edge map data for generating a vertical object projection plot further comprises the steps of:

applying a smoothing technique to the vertical object projection plot for generating a plurality of processed projections.

14. The method of claim 13 wherein the smoothing technique includes adding a fraction of a respective vertical object projection of a previous frame to a respective vertical object projection of a current frame.

15. The method of claim 1 wherein final confidence value for comparison with the threshold value is determined by the formula:

$$f = w_E(v) * f_E + w_M(v) f_M$$

where $f_E$ is the edge-based confidence value, $w_E(V)$ is a weighting factor based on vehicle speed for the edge-based confidence value, $f_M$ is the motion-based confidence value, $w_M(v)$ is a weighting factor based on vehicle speed for the motion-based confidence value.

16. A pedestrian detection system for detecting a pedestrian exterior of a vehicle in an image-based monitoring system, the system comprising:

a image capture device for capturing images exterior of the vehicle;

a processor for processing input image data received from the image capture device, the processor applying an edge-based detection analysis for determining an edge-based confidence value for indicating a confidence level of the pedestrian candidate being a pedestrian, the processor further applying a motion-based detection analysis to the input image data for determining a motion-based confidence value for indicating a confidence level of the pedestrian candidate being a pedestrian, the processor applying a first weighting factor as a function of a vehicle speed to the edge-based confidence value and applying a second weighting factor as a function of the vehicle speed to the motion-based confidence value for determining a final confidence value, wherein the processor compares the final confidence value to a threshold value for determining whether to generate a warning that a pedestrian may be present in the input image data; and an image display for displaying an input image data and for identifying a location of the pedestrian on the image display.

* * * * *